(12) United States Patent
Wu

(10) Patent No.: US 9,746,930 B2
(45) Date of Patent: Aug. 29, 2017

(54) DETECTION AND USABILITY OF PERSONAL ELECTRONIC DEVICES FOR FIELD ENGINEERS

(71) Applicant: General Electric Company, Schenectady, NY (US)

(72) Inventor: Chih-Sung Wu, Dublin, CA (US)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 14/670,293

(22) Filed: Mar. 26, 2015

(65) Prior Publication Data

US 2016/0282948 A1 Sep. 29, 2016

(51) Int. Cl.
*G06F 3/041* (2006.01)
*G06F 3/01* (2006.01)
(Continued)

(52) U.S. Cl.
CPC ............ *G06F 3/017* (2013.01); *G06F 1/1694* (2013.01); *G06F 3/0346* (2013.01);
(Continued)

(58) Field of Classification Search
CPC ......... G06F 3/017; G06F 3/038; G06F 3/0346
See application file for complete search history.

(56) References Cited

U.S. PATENT DOCUMENTS 7,979,235 B2 7/2011 Pasolini et al.
2002/0167699 A1 11/2002 Verplaetse et al.
(Continued)

FOREIGN PATENT DOCUMENTS

EP 1708075 A2 10/2006
EP 2600221 A1 6/2013
(Continued)

OTHER PUBLICATIONS

International Application Serial No. PCT/US2016/024331, International Search Report mailed Jun. 16, 2016, 2 pgs.
(Continued)

*Primary Examiner* — Towfiq Elahi
(74) *Attorney, Agent, or Firm* — Schwegman Lundberg & Woessner, P.A.

(57) ABSTRACT

A system and method for improved detection and usability of personal electronic devices for field engineers is disclosed. A personal electronic device stores a list of commands in memory. The personal electronic device presents a user interface in a relative motion input mode, wherein the user interface in the relative motion mode is divided into a plurality of user interface zones. The personal electronic device receives relative motion input, wherein the relative motion input is received through one or more relative motion sensors of the personal electronic device. The personal electronic device determines whether the received relative motion input matches input associated with a respective command in a list of reference commands. In accordance with a determination that the received relative motion input matches input is associated with a respective command in the list of reference commands, the personal electronic device executes the respective command.

20 Claims, 11 Drawing Sheets

(51) Int. Cl.
*G06F 3/0346* (2013.01)
*G06F 3/0484* (2013.01)
*G06F 3/16* (2006.01)
*G06F 1/16* (2006.01)
*G06F 3/0482* (2013.01)

(52) U.S. Cl.
CPC ........ *G06F 3/0482* (2013.01); *G06F 3/04847* (2013.01); *G06F 3/167* (2013.01)

(56) References Cited

U.S. PATENT DOCUMENTS

| | | |
|---|---|---|
| 2009/0088204 A1 | 4/2009 | Culbert et al. |
| 2009/0132197 A1 | 5/2009 | Rubin et al. |
| 2009/0153466 A1* | 6/2009 | Tilley .................. G06F 3/017 345/156 |
| 2009/0195497 A1 | 8/2009 | Fitzgerald et al. |
| 2009/0262074 A1 | 10/2009 | Nasiri et al. |
| 2010/0305845 A1 | 12/2010 | Alexandre et al. |
| 2011/0044501 A1 | 2/2011 | Tu et al. |
| 2011/0106418 A1 | 5/2011 | van der Merwe |
| 2011/0109548 A1 | 5/2011 | Tu et al. |
| 2011/0193788 A1 | 8/2011 | King et al. |
| 2012/0001859 A1* | 1/2012 | Kim .................. G06F 3/0418 345/173 |
| 2012/0265716 A1 | 10/2012 | Hunzinger et al. |
| 2013/0002531 A1* | 1/2013 | Krahenbuhl .......... G06F 3/0416 345/156 |
| 2013/0091462 A1 | 4/2013 | Gray et al. |
| 2013/0102323 A1 | 4/2013 | Czompo |
| 2013/0154952 A1 | 6/2013 | Hinckley et al. |
| 2013/0205214 A1 | 8/2013 | Gazdzinski |
| 2013/0339850 A1 | 12/2013 | Hardi et al. |
| 2014/0139637 A1* | 5/2014 | Mistry ................ H04N 5/2252 348/46 |
| 2014/0181669 A1* | 6/2014 | Tung .................... G06F 3/0346 715/720 |
| 2014/0285461 A1 | 9/2014 | Campbell et al. |
| 2015/0024800 A1 | 1/2015 | Rodriguez et al. |

FOREIGN PATENT DOCUMENTS

| | | |
|---|---|---|
| WO | WO-2004017187 A2 | 2/2004 |
| WO | WO-2005027550 A1 | 3/2005 |
| WO | WO-2005103863 A2 | 11/2005 |
| WO | WO-2011028325 A2 | 3/2011 |
| WO | WO-2011057287 A1 | 5/2011 |
| WO | WO-2011149709 A1 | 12/2011 |
| WO | WO-2012050377 A2 | 4/2012 |
| WO | WO-2012134797 A1 | 10/2012 |
| WO | WO-2012166354 A2 | 12/2012 |
| WO | WO-2014016841 A1 | 1/2014 |
| WO | WO-2016154590 A1 | 9/2016 |

OTHER PUBLICATIONS

International Application Serial No. PCT/US2016/024331, Written Opinion mailed Jun. 16, 2016, 6 pgs.

* cited by examiner

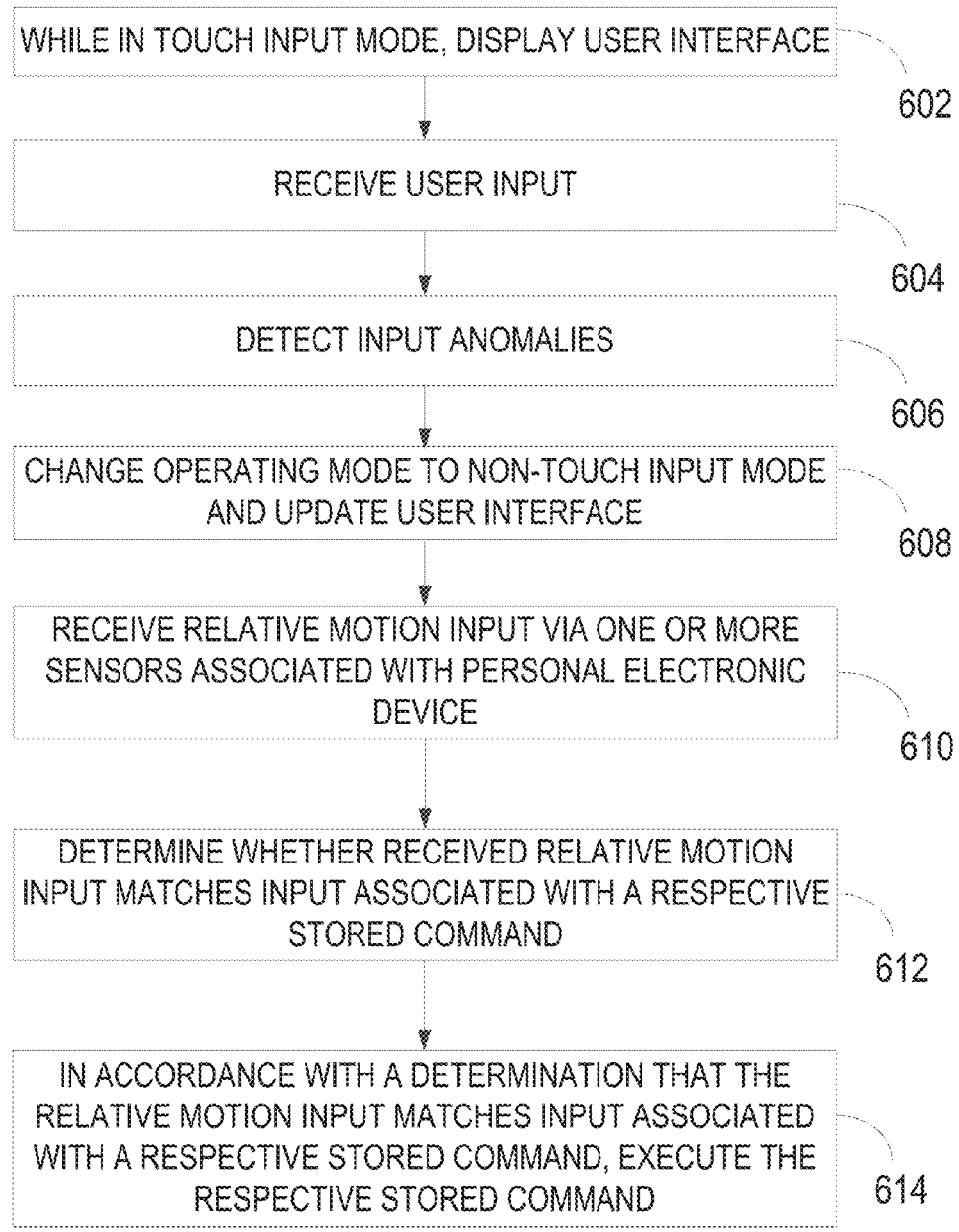
FIGURE 6     600

DETECTION AND USABILITY OF PERSONAL ELECTRONIC DEVICES FOR FIELD ENGINEERS

TECHNICAL FIELD

The disclosed embodiments relate generally to the field of electronic devices, and in particular to user interfaces for electronic devices.

BACKGROUND

Computer devices have increasingly become smaller and more portable as the technology improves. This improvement has led to widespread adoption of personal computer devices (e.g., smartphones, tablet computers, wearable computer devices, and so on). These devices have become increasingly important to users' lives.

Smaller, more portable electronic devices increasingly allow workers to take their personal electronic devices with them out of the office for use in the field to collect data and improve productivity. Unfortunately many of these devices rely on a touchscreen as the primary input mechanism, and in many cases field work is accomplished in locations and environments that make a touchscreen difficult to use. For example, cold environments might necessitate gloves or mittens, which render touchscreens less effective. As a result, it can be difficult to use a personal electronic device in many real-world locations and contexts.

DESCRIPTION OF THE DRAWINGS

Some embodiments are illustrated by way of example and not limitation in the figures of the accompanying drawings, in which:

FIG. 6 is a flow diagram illustrating a method, in accordance with an example embodiment, for improving input detection and usability of personal electronic devices when touch input is not the optimal input method.

Like reference numerals refer to corresponding parts throughout the drawings.

DETAILED DESCRIPTION

Figure 1:
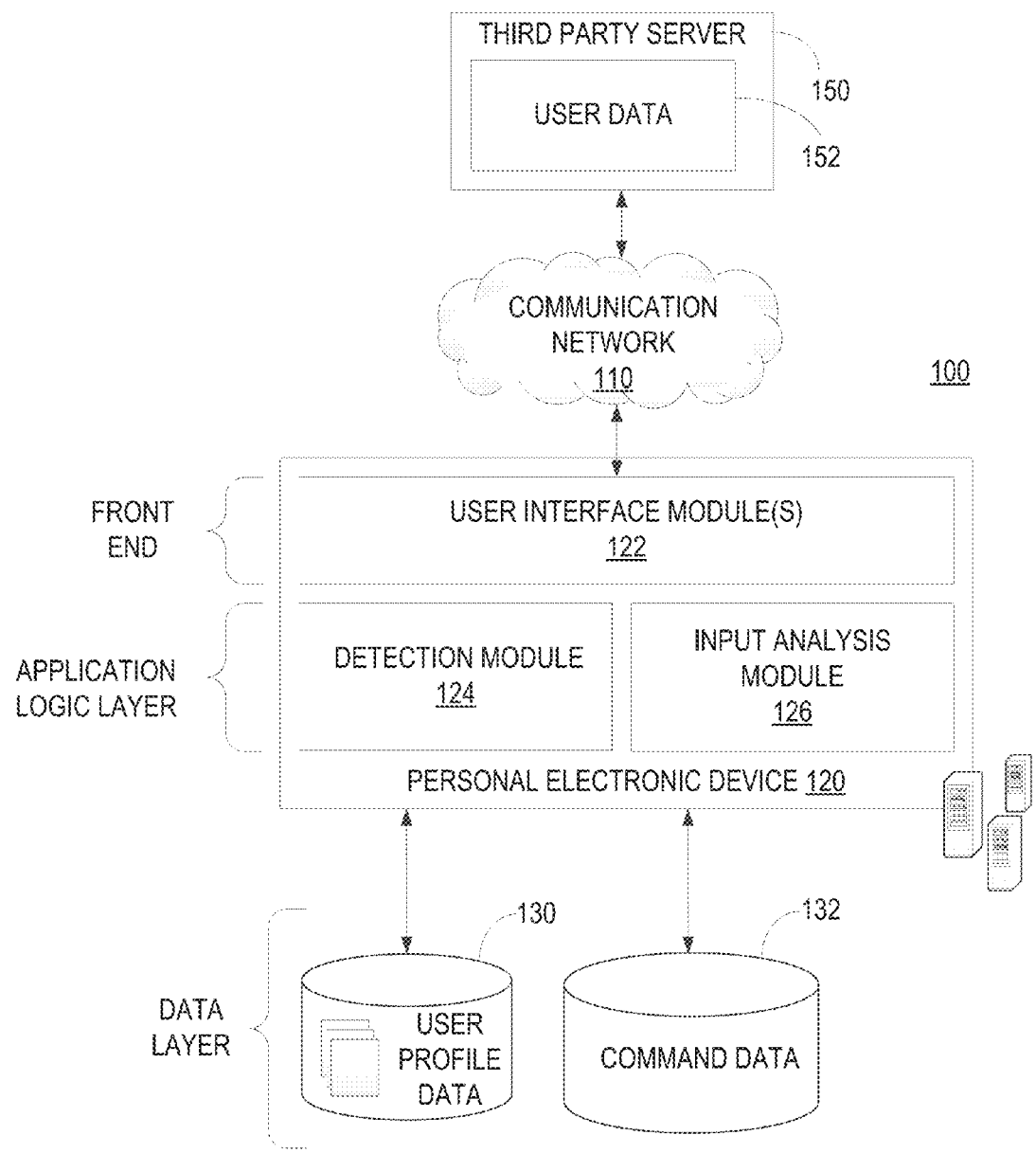
FIG. 1 is a network diagram depicting a personal electronic device, in accordance with an example embodiment, that includes various functional components.

The present disclosure describes methods, systems, and computer program products for improving input detection and usability of personal electronic devices when touch input is not the optimal input method. In the following description, for purposes of explanation, numerous specific details are set forth to provide a thorough understanding of the various aspects of different embodiments. It will be evident, however, to one skilled in the art, that the any particular embodiment may be practiced without all of the specific details and/or with variations permutations and combinations of the various features and elements described herein.

In some example embodiments, many personal electronic devices have touchscreens that are used to receive input from a user. For example, smartphones, tablet computers, and smart watches all use a touchscreen interface as the primary means for receiving input from a user. However, if the user has difficulty using a touchscreen to input data, it can be very difficult for the user to use one of these personal electronic devices effectively. For example, some users in the field wear gloves or have greasy or dirty hands. In other examples, some users have a disability that prevents effective use of a touchscreen.

In some example embodiments, a personal electronic device can detect usability problems by the user. For example, if the personal electronic device detects a very large touch area on a touchscreen (e.g., the user is wearing large work gloves, mittens, and so on), the personal electronic device determines that the user is having difficulty inputting data on the touchscreen. In another example, if the user frequently has input errors (e.g., frequently has to undo commands), the personal electronic device also determines that touchscreen input is difficult. In response to determining that touchscreen input is difficult for a user, the personal electronic device switches into a non-touchscreen mode. In some example embodiments, the user can directly choose to enter non-touchscreen mode.

In some example embodiments, non-touchscreen mode includes a specialized user interface to allow easier use. Thus, in some example embodiments, in the non-touchscreen mode, the user interface is organized in to a series of square sections. Navigation between the sections is easier and controllable through relative motion inputs. In some example embodiments, relative motion inputs include non-touch inputs such as voice input or camera input. In other example embodiments, relative motion inputs include moving or rotating the device relative to a previous position. In some example embodiments, relative motion inputs can be input by any sensor on the personal electronic device with the exception of the touch screen. In some example embodiments, a notification is given to the user before switching into non-touch mode. In some example embodiments, the user directly selects switching into non-touch mode.

In some example embodiments, once in non-touch mode, the personal electronic device receives input from a user via one or more sensors associated with the personal electronic device. For example, the personal electronic device can detect movement or rotation of the device through either an accelerometer or a gyroscope. In other example embodiments, the personal electronic device receives input from a user through a microphone (voice commands and so on) or a camera (user motion).

In some example embodiments, the personal electronic device receives the input from a user and then compares the received input to a plurality of reference commands. Each respective reference command has one or more inputs that are associated with the respective reference command. If a match is found, the associated command is executed. If no match is found, the personal electronic device then attempts to match the received input to its closest possible match in the list of reference commands.

In some example embodiments, the personal electronic device determines the best match by identifying all the commands that are of the same type of input (e.g., if the input command involved tilting the device backward, only commands with associated input that involve tilting of the device are compared). Then the personal electronic device determines one command that best matches the input. For example, the device calculates the difference between the received input and the reference command input for each possible command and selects the command whose input has the smallest difference from the received input.

In some example embodiments, the personal electronic device executes the determined best match command. Once the best match command has been executed, the personal electronic device determines whether the best match command was the command the user intended. In some example embodiments, the personal electronic device determines whether the best match command was the user-intended command by monitoring the subsequent user activity. For example, if the user immediately reverses the action, the best match command is determined not to be the user-intended command. However, if the user does not reverse the command and continues to enter additional input, the personal electronic device determines that the best match command is the user-intended command.

In some example embodiments, in accordance with a determination that the best match command is the user-intended command, the personal electronic device adds the new input to the input associated with the best match command. For example, the personal electronic device detects a tilt of five degrees. The personal electronic device determines that no current command is triggered by a tilt of five degrees. It then determines that the "activate currently selected icon" action is triggered by a tilt of three degrees and is the best match for the determined output. The personal electronic device then executes the "activate currently selected icon" command. The user does not undo the command and thus the personal electronic device updates the input associated with the "activate currently selected icon" command to include any tilt within a range of three to five degrees.

FIG. 1 is a network diagram depicting a personal electronic device 120, in accordance with an example embodiment, that includes various functional components. In some example embodiments, the personal electronic device 120 is part of a client-server system 100 that includes the personal electronic device 120 and one or more third party servers 150. One or more communications networks 110 interconnect these components. The communications network 110 may be any of a variety of network types, including local area networks (LANs), wide area networks (WANs), wireless networks, wired networks, the Internet, personal area networks (PANs), or a combination of such networks.

In some embodiments, as shown in FIG. 1, the personal electronic device 120 is generally based on a three-tiered architecture, consisting of a front-end layer, an application logic layer, and a data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various embodiments have been omitted from FIG. 1. However, a skilled artisan will readily recognize that various additional functional modules and engines may be used with a personal electronic device 120, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the personal electronic device 120 is depicted in FIG. 1 as having a three-tiered architecture, the various embodiments are by no means limited to this architecture.

As shown in FIG. 1, the front-end layer consists of user interface module(s) 122, which receives input from a user through one or more input systems (e.g., microphone, motion sensors, camera, and so on), and presents the appropriate responses on one or more output systems (e.g., display, speakers, and so on).

As shown in FIG. 1, the data layer includes one or more databases, including databases for storing data for users of the personal electronic device 120, including user profile data 130 and command data 132 (e.g., data listing the input associated with one or more commands available through the personal electronic device 120).

In some embodiments, the user profile data 130 includes data associated with the user, including but not limited to user name, user age, user location, user activity data (e.g., applications and commands used by the user), user schedule data (e.g., data about when the user is working and when the user is likely to be unable to use a touchscreen), and other data related to and obtained from the user.

The command data 132 includes data that maps certain types of non-touch based input to one or more commands provided by the personal electronic device 120. Each command has a list of inputs that will trigger it. For example, the command data 132 is a table and includes an entry for a scroll up command. The associated input is an accelerometer detecting sudden upward acceleration of the personal electronic device 120 in the range of 0.5-1.0 inches per second. Another example command in the command data 132 is page up, which is associated with a detected upward acceleration of in the range of two to three inches per second. Thus, the personal electronic device 120 will match received input against the stored command data 132 and execute one of the two different actions.

The personal electronic device 120 provides a broad range of other applications and services that allow users the opportunity to share and receive information, often customized to the interests of the users.

In some embodiments, the application logic layer includes various application server modules, which, in conjunction with the user interface module(s) 122, generate various user interfaces to receive input from and deliver output to a user. In some embodiments, individual application modules are used to implement the functionality associated with various applications, services, and features of the personal electronic device 120. For instance, a messaging application, such as an email application, an instant messaging application, or some hybrid or variation of the two, may be implemented with one or more application modules. Similarly, a web browser enabling members to view web pages may be embodied with one or more application modules. Of course, other applications or services that utilize a detection module 124 and an input analysis module 126 may be separately embodied in their own application modules.

In addition to the various application server modules, the application logic layer includes a detection module 124 and an input analysis module 126. As illustrated in FIG. 1, in some embodiments, the detection module 124 and the input analysis module 126 are embodied as modules that operate in conjunction with various application modules. For instance, any number of individual application modules can invoke the functionality of the detection module 124 and the input analysis module 126 to receive user input and analyze it. However, in various alternative embodiments, the detection module 124 and the input analysis module 126 may be embodied as their own application modules such that they operate as a stand-alone application.

Generally, the detection module 124 detects that a user is not able to efficiently use the touchscreen to input user commands. In some example embodiments, this is based on the size of the user's contact with a touchscreen (e.g., very large contact spaces may indicate that the user is wearing gloves or mittens), trouble detecting user input (e.g., based on dirt or oil on the user's hands), user disability (e.g., unable to hold hands still), or direct user instruction (e.g., the user selects an option indicating that using the touchscreen is currently difficult). In accordance with a determination that the user is not able to efficiently use the touchscreen, the personal electronic device 120 changes to a non-touch mode. In some example embodiments, the personal electronic device 120 was originally in a touch mode or normal operation mode.

In some example embodiments, the detection module 124 switches the personal electronic device 120 into non-touch mode by changing the displayed user interface into a user interface that is organized into a series of square sections, for easy navigation.

The input analysis module 126 stores a list of possible commands that the personal electronic device 120 is able to execute. Each possible command also includes a list of one or more user inputs that are associated with the possible command and will result in command execution.

In some example embodiments, the input analysis module 126 receives input data from the detection module 124. In some example embodiments, the input data includes more than one component. The input analysis module 126 compares the input data against the one or more stored commands.

In some example embodiments, the input analysis module 126 finds an exact match (e.g., a command that lists input that is a direct match for the received input). For example, an input is received that is a movement of the personal electronic device 120 accelerating upward in three inches per second. The input analysis module 126 determines if any of the listed commands include raising the personal electronic device 120 in three inches per second as the input associated with the command.

In some example embodiments, in accordance with a determination that the received input matches the input for a command stored in the list of commands, the input analysis module 126 causes the matching command to be executed. In accordance with a determination that the received input does not match any stored command, the input analysis module 126 determines the closest matching command. In some example embodiments, the closest match is determined based on a fuzzy matching algorithm. For example, the input analysis module 126 can determine one or more commands with inputs that are of the same type as the received user input. Thus, if the received user input involves rotating the personal electronic device 120, the input analysis module 126 will identify one or more command with associated inputs that involve rotation of the personal electronic device 120.

In some example embodiments, the input analysis module 126 can determine the closeness of the stored associated input to the received user input. For example, if the received user input is a rotation of the personal electronic device 120 back fifteen degrees, then a command with an associated input range of rotation back five to ten degrees would be a closer match than a command with an associated input range of rotation forward five to ten degrees.

In some example embodiments, once the best matching command is identified, the input analysis module 126 causes the personal electronic device 120 to execute the best matching command. In some example embodiments, the input analysis module 126 monitors user response to the executed best matching command to determine if the user accepts the command (e.g., continues to use the device without reversing the command) or immediately reverses it (e.g., an immediate reversal would indicate that the user did not wish the best matching command to be executed).

In some example embodiments, in accordance with a determination that the user accepts the best matching command, the input data associated with the best matching command is updated to extend its acceptable range to include the received user input.

In some example embodiments, the user can manually update the list of commands stored at the personal electronic device 120 or an input associated with an already stored command. In some example embodiments, the user enters a command editing mode (e.g., by selecting an option available through the user interface), selects a specific command, and then enters new or updated associated input data for the selected command (either through selecting input on a list of inputs or by actually causing the associated input). The list of commands is then updated on the personal electronic device 120 and stored.

In some example embodiments, a third party server 150 stores user data 152. This user data 152 can incorporate any information about the user, including, but not limited to, user preferences, user history, user location, user demographic information, and command input data for the user. In some example embodiments, the user can switch from one personal electronic device 120 to a different computer device and import all the relevant user profile data from the user data 152 stored at the third party server 150. In this way, the user's command data will be available at the new device automatically.

Figure 2:
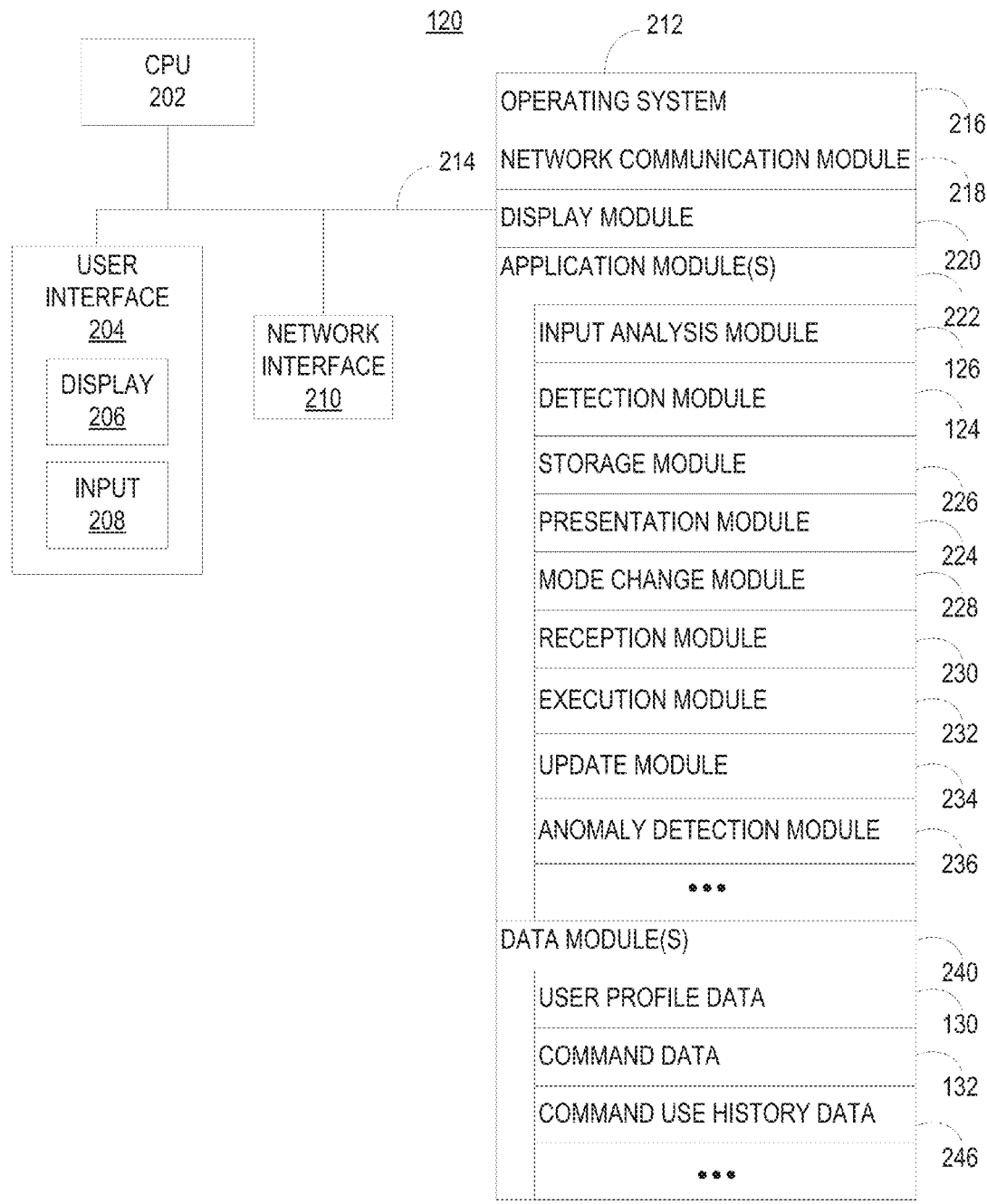
FIG. 2 is a block diagram illustrating a personal electronic device, in accordance with an example embodiment.

FIG. 2 is a block diagram illustrating the personal electronic device 120, in accordance with an example embodiment. The personal electronic device 120 typically includes one or more processing units (CPUs) 202, one or more network interfaces 210, a memory 212, and one or more communication buses 214 for interconnecting these components. The personal electronic device 120 includes a user interface 204. The user interface 204 includes a display 206 and optionally includes an input 208, such as a keyboard, mouse, touch-sensitive display, movement sensors (e.g., accelerometer or gyroscope), camera, or other input means. Furthermore, some personal electronic devices 120 use a microphone and voice recognition to supplement or replace the keyboard.

Memory 212 includes high-speed random-access memory, such as dynamic random-access memory (DRAM), static random-access memory (SRAM), double data rate random-access memory (DDR RAM), or other random-access solid-state memory devices, and may include non-volatile memory, such as one or more magnetic disk storage devices, optical disk storage devices, flash memory devices, or other non-volatile solid-state storage devices.

Memory 212 may optionally include one or more storage devices remotely located from the CPU(s) 202. Memory 212, or alternately, the non-volatile memory device(s) within memory 212, comprise(s) a non-transitory computer readable storage medium.

In some embodiments, memory 212 or the computer readable storage medium of memory 212 stores the following programs, modules, and data structures, or a subset thereof:

- an operating system 216 that includes procedures for handling various basic system services and for performing hardware dependent tasks;
- a network communication module 218 that is used for connecting the personal electronic device 120 to other computers via the one or more network interfaces 210 (wired or wireless) and one or more communication networks, such as the Internet, other wide area networks, local area networks, metropolitan area networks, etc.;
- a display module 220 for enabling the information generated by the operating system 216 and application module(s) 222 to be presented visually on the display 206;
- one or more application module 222 for handling various aspects of providing the services associated with the personal electronic device 120, including but not limited to:
  - an input analysis module 126 for receiving input components and determining whether the input components match any of the input components associated with commands in the list of commands stored in the command data 132;
  - a detection module 124 for detecting, based on received input, that a user is not able to efficiently use the touchscreen to input user commands, and wherein this detection is based on detecting one or more input anomalies in the received user input, including but not limited to: size of input contact, steadiness of input contact, strength of input contact (e.g., whether input is being disrupted by dirt and/or oil on the user's hands);
  - a storage module 226 for storing and managing a list of commands and the associated input data in the command data 132;
  - a presentation module 224 for causing a user interface to be presented on a screen associated with the personal electronic device 120 and updating the user interface based on the operating mode of the personal electronic device 120;
  - a mode change module 228 for changing the operating mode of the personal electronic device 120 from touch input mode to relative motion input mode or from relative motion input mode to touch input mode;
  - a reception module 230 for receiving user input from a sensor associated with the personal electronic device 120;
  - an execution module 232 for causing a selected command to be executed on the personal electronic device 120;
  - an update module 234 for updating command data stored for one or more commands;
  - an anomaly detection module 236 for detecting anomalies in user input (e.g., the size of the contact, steadiness of the contact, and so on); and
  - data module(s) 240, for storing data relevant to the personal electronic device 120, including but not limited to:
    - user profile data 130 for storing profile data related to a user of the personal electronic device 120;
    - command data 132, including data related to commands that can be executed by the personal electronic device 120 and one or more associated inputs (or range of inputs) that will result in the command being executed; and
    - command use history data 246 including a list of all used commands and the number of instances that each command is used.

Figure 3:
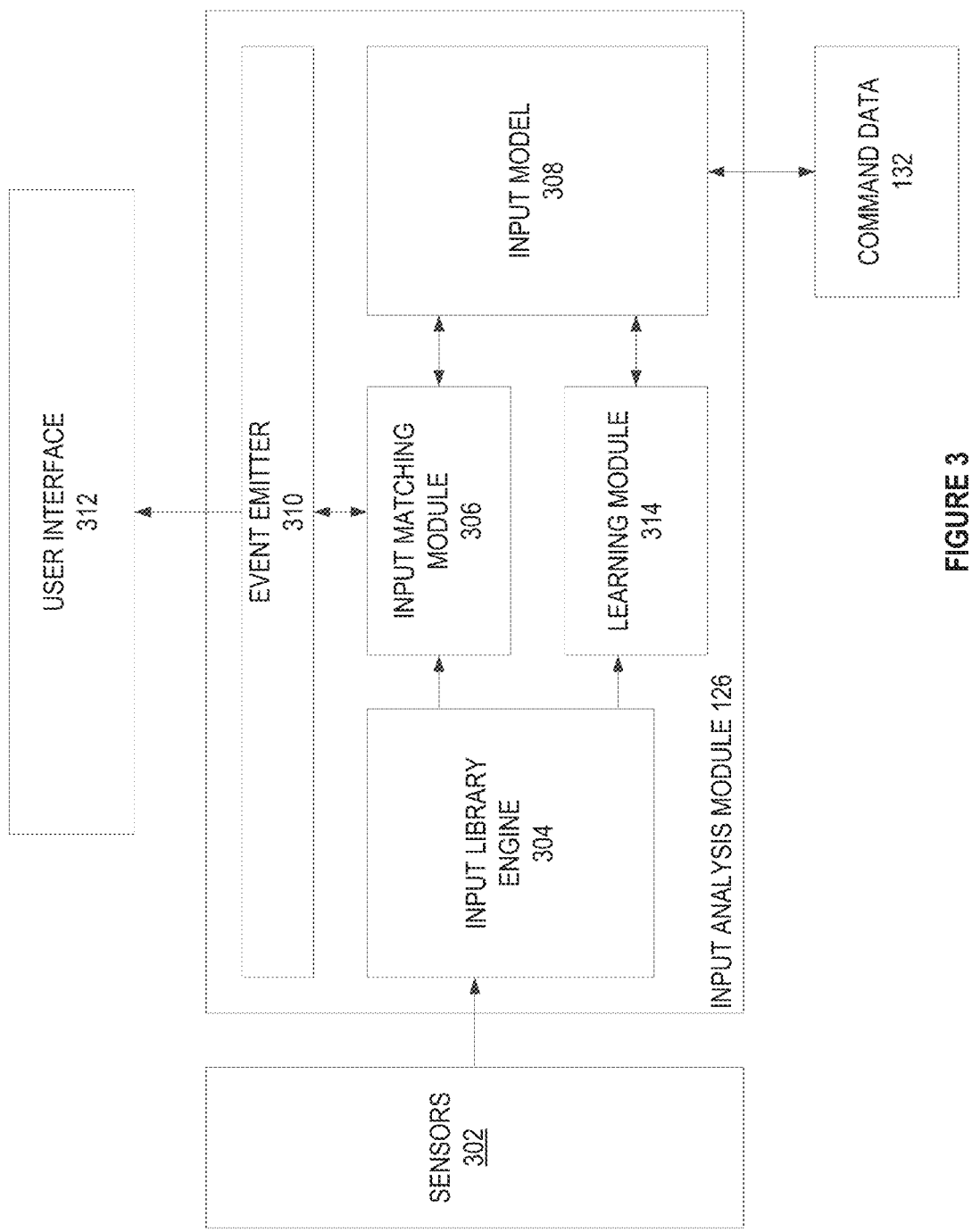
FIG. 3 illustrates a block diagram of an input analysis module, in accordance with an example embodiment.

FIG. 3 illustrates a block diagram of the input analysis module 126, in accordance with an example embodiment. According to one embodiment, one or more sensors 302 of the personal electronic device 120 detect input from a user. The sensors 302 transfer the detected input to the input library engine 304. The input library engine 304 receives the input data from the one or more sensors 302 and converts the data into input data that can be used by the input analysis module 126. For example, the data received from the sensors 302 is raw data from the sensors 302 and is converted into a form useful to the rest of the input analysis module 126.

In some example embodiments, once the data has been converted into useful input data from by the input library engine 304, the input data is then transferred to the input matching module 306. The input matching module 306 uses the received input data to build an input model 308 of the input. Once the input model 308 has been built, the input matching module 306 uses the stored command data 132 to find a command with associated inputs that match the received input data.

In some example embodiments, the input matching module 306 finds an exact match in the input data stored in the command data 132. For example, the received input is a ten degree tilt to the left; the input analysis module 126 determines that a first command stored in the command data 132 defines associated input as any left tilt within the range of five degrees to twelve degrees. In this case the input analysis module 126 determines that the received input matches the range of input associated with the first command and transmits the first command to the event emitter 310.

In some example embodiments, the event emitter 310 transmits the selected command to the user interface (or system that controls the user interface) where the command is executed.

In some example embodiments, the input matching module 306 does not find an exact match. Continuing the above example, if the received input was a left tilt of thirty degrees, it would no longer match the input range (five degrees to twelve degrees) associated with the first command. The input matching module 306 would then need to use the input model 308 that was constructed to find a closest matching command. In some example embodiments, the input matching module 306 determines the best matching command by using fuzzy matching algorithms.

In some example embodiments, the input matching module 306 would determine a command match score for each potential matching command. The command with the highest potential matching score would then be selected as the best matching command and selected for execution. In some example embodiments, command match scores are selected based on whether the inputs are of the same type. For example, a command with an associated input based on leftward tilting of the personal electronic device (e.g., the personal electronic device 120 of FIG. 1) would be a better match, and thus have a higher matching score, with received input data indicating a left tilt than with a command with associated input that includes microphone detection of sound.

In some example embodiments, the command match score is based on the direction of input. For example, if the received input data is movement of the personal electronic device 120 up three inches, then a command with a reference input upward will have a higher score than a command with reference input downward. Similarly, the command match score is based on the degree. Thus, a command with reference input data that is a five-degree tilt leftward will have a high match score based on input that is a ten-degree tilt leftward than a command with reference input data that is thirty degrees leftward.

In some example embodiments, the learning module 314 receives input data form the input library engine 304 that represents new input to be associated with a new command in the command data 132 or updated input data for an existing command.

Figure 4:
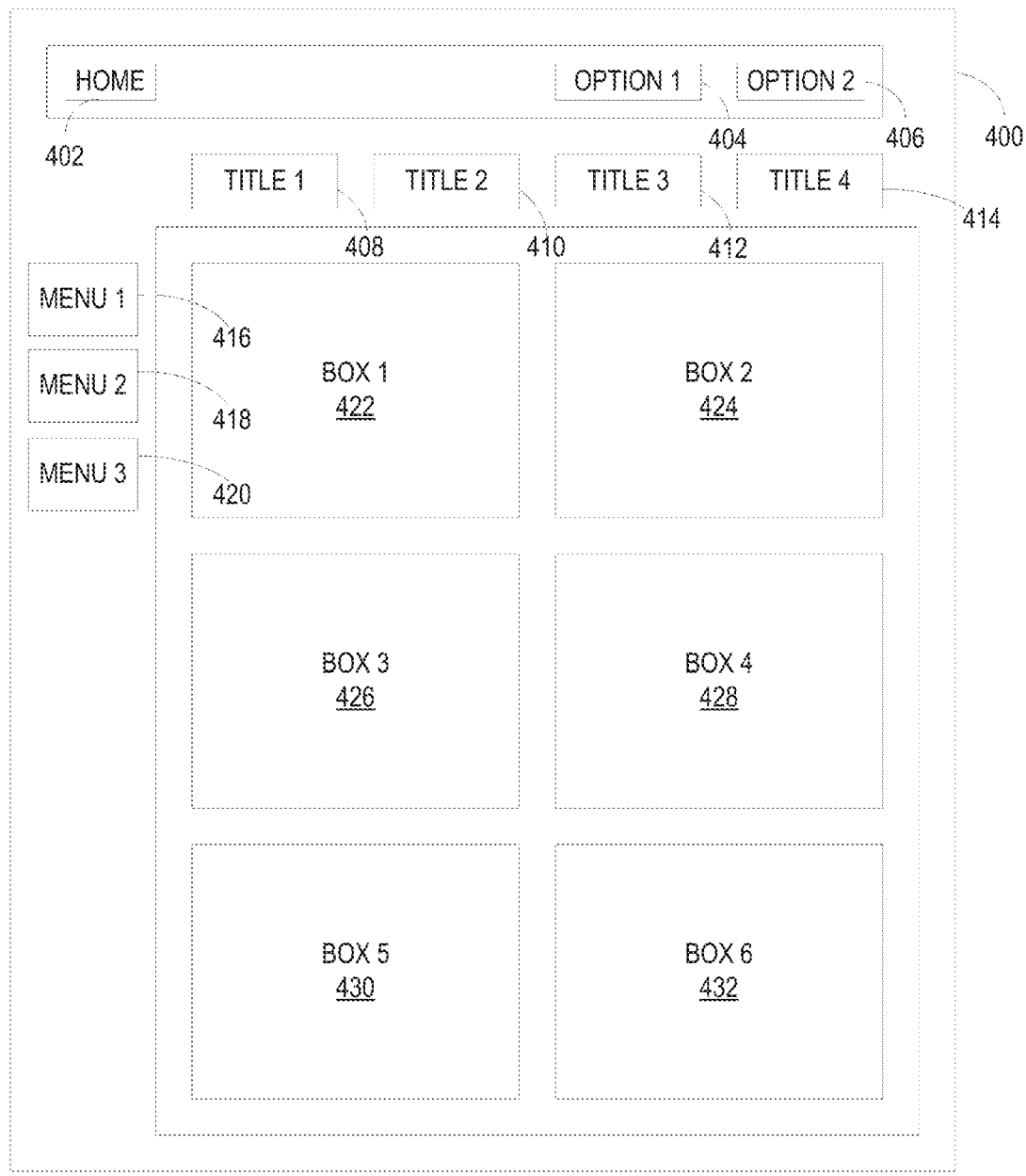
FIG. 4 illustrates an exemplary user interface of a personal electronic device in relative motion input mode, in accordance with an example embodiment.

FIG. 4 illustrates an exemplary user interface of a personal electronic device (e.g., personal electronic device 120 of FIG. 1) in relative motion input mode, in accordance with an example embodiment. As can be seen, the user interface 400 shown in FIG. 4 has been formatted to be very simple. All the user interface elements have been standardized into zones that are simple rectangles and all the zones have been arranged in basic rows and columns. Thus, a limited number of commands can be used to easily and quickly navigate through the user interface 400.

In some example embodiments, the interface 400 includes a home button 402, two option buttons (404 and 406), four title buttons (408, 410, 412, and 414), three menu buttons (416, 418, and 420), and six content boxes (422, 424, 426, 428, 430, and 432). These components are arranged into five columns and at least five rows. In some example embodiments, information about the components in the user interface 400 can be stored in a simple data structure. For example:

```
var matrix = [
    ['home', null, null, 'option 1', 'option 2'],
    [null, 'title 1', 'title 2', 'title 3', 'title 4'],
    ['menu 1', 'box 1', 'box 1', 'box 2', 'box 2'],
    ['menu 2', 'box 1', 'box 1', 'box 2', 'box 2'],
    ['menu 3', 'box 1', 'box 1', 'box 2', 'box 2'],
    ['null', 'box 3', 'box 3', 'box 4', 'box 4'],
    ['null', 'box 5', 'box 5', 'box 6', 'box 6']
]
```

Using this simple data structure, the user interface 400 is relatively simple to navigate with a limited number of possible user inputs. In some example embodiments, other data structures or storage structures are used to easily navigate the user interface 400.

Figure 5:
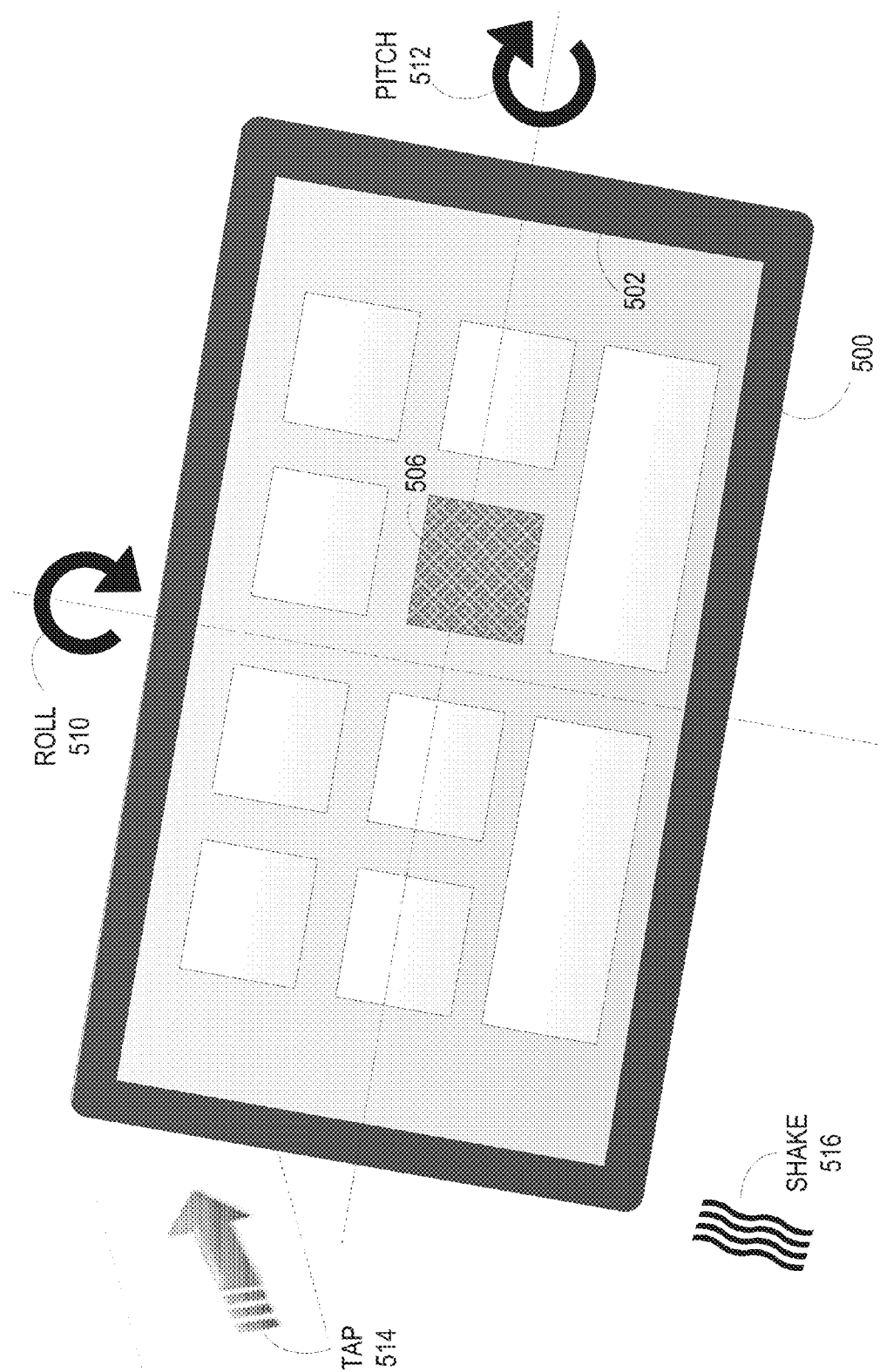
FIG. 5 illustrates an exemplary embodiment of a personal electronic device in relative motion input mode, in accordance with an example embodiment.

FIG. 5 illustrates an exemplary embodiment of a personal electronic device 500 in relative motion input mode, in accordance with an example embodiment. As can be seen, the particular personal electronic device 500 includes a display 502 (e.g., a touchscreen display). However, because the personal electronic device 500 is in relative motion input mode, the displayed user interface includes a series of components (e.g., icons, buttons, data, and so on) as rectangles in a pattern of rows and columns. Currently component 506 has been selected and the user interface reflects the selected component 506 by giving the selected component 506 a distinct visual appearance (represented in the figure by different shading).

In some example embodiments, the personal electronic device 500 in relative motion input mode allows input from one or more different motions. For example, the user can roll 510 the personal electronic device 500 along the y-axis of the personal electronic device 500. Another example input is to pitch 512 the personal electronic device 500 around the x-axis. The personal electronic device 500 can also detect tapping (e.g., or other sudden movement or acceleration) 514 of the personal electronic device 500 or shaking 516 of the device 500. Each of these potential inputs can be mapped by the personal electronic device 500 to specific commands. When one of these inputs is detected, the personal electronic device 500 can then execute the associated command.

FIG. 6 is a flow diagram illustrating a method 600, in accordance with an example embodiment, for improving input detection and usability of personal electronic devices when touch input is not the optimal input method. Each of the operations shown in FIG. 6 may correspond to instructions stored in a computer memory or computer-readable storage medium. In some embodiments, the method 600 described in FIG. 6 is performed by the personal electronic device (e.g., personal electronic device 120 in FIG. 1).

In some embodiments, the method 600 is performed at a personal electronic device (e.g., personal electronic device 120 in FIG. 1) including one or more processors and memory storing one or more programs for execution by the one or more processors.

In some example embodiments, the personal electronic device (e.g., personal electronic device 120 in FIG. 1) is initially in a touch input mode. In some example embodiments, touch input mode is the standard mode for a personal electronic device that includes a touchscreen and means that the primary way of interacting with the device would be through touch input received through the touchscreen (other input means may still be available).

In some example embodiments, while in touch input mode, the personal electronic device (e.g., personal electronic device 120 in FIG. 1) displays (602) a user interface to a user. While the device is in touch input mode, each application displays its standard or preferred user interface. While displaying the user interface, the personal electronic device receives (604) user input. In some example embodiments, user input includes touch input on a touch screen (e.g., finger contacts that tap, swipe, and so on.)

In some example embodiments, the personal electronic device (e.g., personal electronic device 120 in FIG. 1) detects (606) anomalies in received input (touch input). Examples of anomalies include larger than normal contact size (e.g., the user is wearing gloves or mittens), unsteady contact (e.g., the user has difficulty holding hands or fingers steady), frequent input error (e.g., the user routinely has to undo commands and give the same or similar input again seeking a different command), weakly detected input (fingers or screen that is dirty or otherwise compromised), and so on.

In some example embodiments, in response to detecting input anomalies, the personal electronic device (e.g., personal electronic device 120 in FIG. 1) changes (608) the operating mode from touch input mode (e.g., the mode where input primarily comes from a touch screen) to the relative motion input mode (e.g., the operating mode where input primarily comes from non-touch based systems.) In some example embodiments, the personal electronic device (e.g., personal electronic device 120 in FIG. 1) causes a notification to be displayed indicating the changes. In other example embodiments, the personal electronic device queries the user (e.g., through an onscreen prompt) whether the user accepts the operating mode switch. If the user rejects the switch, no change is made.

In some example embodiments, the personal electronic device (e.g., personal electronic device 120 in FIG. 1) then updates (608) the user interface to a user interface type configured to be easily used in the relative motion input mode. For example, the elements of the user interface are resized and rearranged into a grid arrangement and changed in shape to be rectangular. In this way, the user interface can be navigated more easily with relatively few commands.

In some example embodiments, the personal electronic device (e.g., personal electronic device 120 in FIG. 1) then receives (610) relative motion input via one or more sensors (e.g., gyroscope, accelerometer, microphone, camera) associated with the personal electronic device. The personal electronic device analyzes the received relative motion input to determine (612) whether the received input matches the input associated with a respective command in a stored list of commands. For example, the personal electronic device (e.g., personal electronic device 120 in FIG. 1) stores a list of all commands it currently can react to and also stores the specific input that will cause each command to execute.

In accordance with a determination that the received relative motion input matches input associated with a respective stored command, the personal electronic device (e.g., personal electronic device 120 in FIG. 1) executes (614) the respective stored command.

Figure 7A:
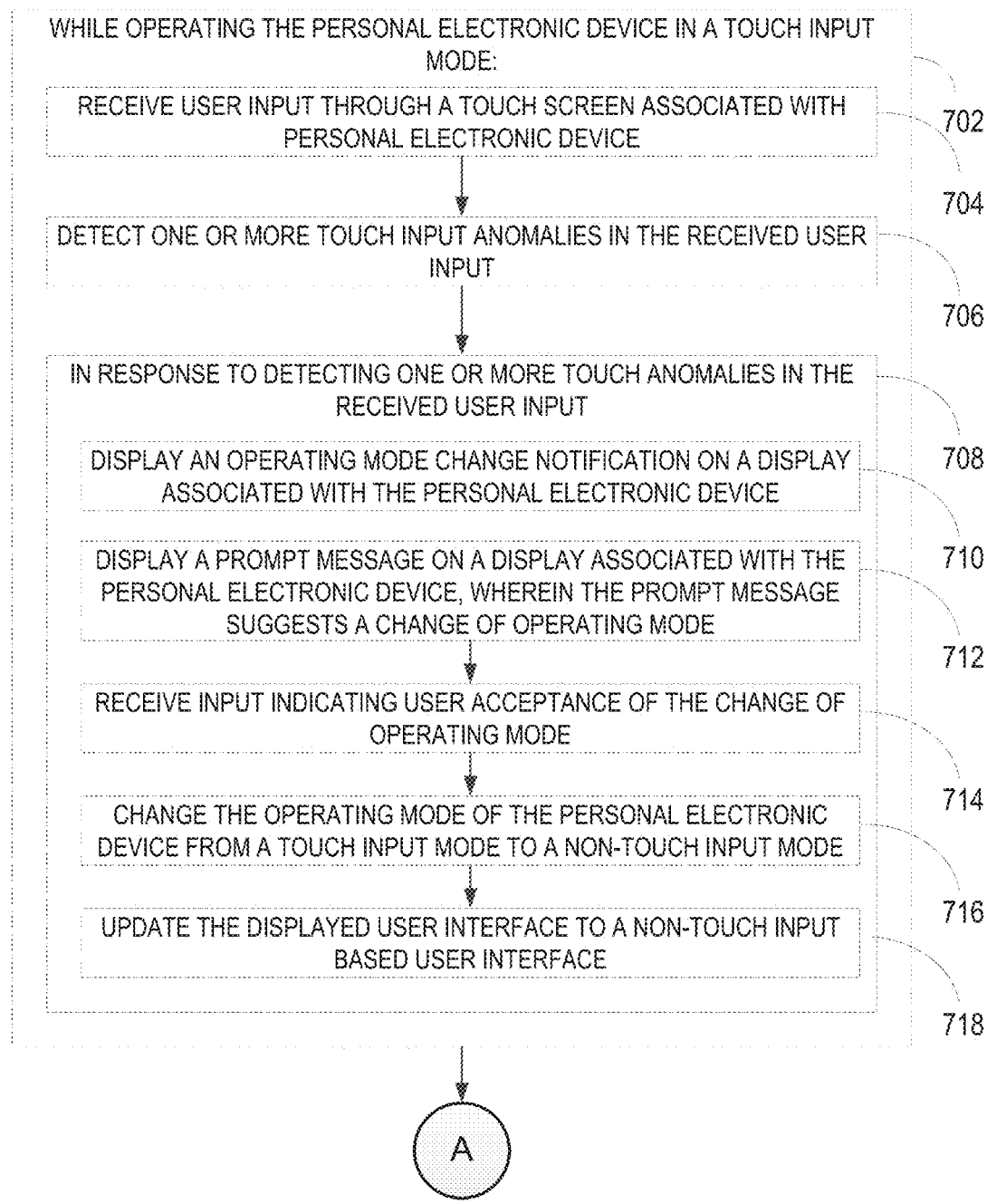
FIGS. 7A-7C are flow diagrams illustrating a method, in accordance with an example embodiment, for improving input detection and usability of personal electronic devices when touch input is not the optimal input method.

FIG. 7A is a flow diagram illustrating a method, in accordance with an example embodiment, for improving input detection and usability of personal electronic devices when touch input is not the optimal input method. Each of the operations shown in FIG. 7A may correspond to instructions stored in a computer memory or computer-readable storage medium. Optional operations are indicated by dashed lines (e.g., boxes with dashed-line borders). In some embodiments, the method described in FIG. 7A is performed by the personal electronic device (e.g., personal electronic device 120 in FIG. 1). However, the method described can also be performed by any other suitable configuration of electronic hardware.

In some embodiments, the method is performed at a personal electronic device (e.g., personal electronic device 120 in FIG. 1) including one or more processors and memory storing one or more programs for execution by the one or more processors.

In some example embodiments, while the personal electronic device (e.g., personal electronic device 120 in FIG. 1) is operating (702) in a touch input mode, the personal electronic device receives (704) user input through a touchscreen associated with the personal electronic device. For example, the user taps or swipes on a touchscreen of the device.

In some example embodiments, while analyzing the received input, the personal electronic device (e.g., personal electronic device 120 in FIG. 1) detects (706) one or more touch input anomalies in the received user input. As noted above, examples of anomalies include larger than normal contact size (e.g., the user is wearing gloves or mittens), unsteady contact (e.g., the user has difficulty holding hands or fingers steady), frequent input error (e.g., the user routinely has to undo commands and give the same or similar input again seeking a different command), weakly detected input (fingers or screen that is dirty or otherwise compromised), and so on. Thus, an anomaly is detected when the user is having difficulty entering input into the personal electronic device (e.g., personal electronic device 120 in FIG. 1) via a touchscreen interface.

In some example embodiments, the personal electronic device (e.g., personal electronic device 120 in FIG. 1), in response to detecting (708) one or more touch anomalies in the received user input, displays (710) (or causes to be displayed) an operating mode change notification on a display associated with the personal electronic device. For example, the screen of a tablet computer displays a pop-up window notifying a user that the operating mode of the tablet is going to change from input touch mode to non-input touch mode. In other example embodiments, the user interface displays a message in the message status bar because a pop-up window can interrupt a user's work flow, which is generally undesirable.

In other example embodiments, in response to detecting (708) one or more touch anomalies in the received user input, the personal electronic device (e.g., personal electronic device 120 in FIG. 1) displays (712) a prompt message on a display associated with the personal electronic device, wherein the prompt message suggests a change of operating mode. For example, the personal electronic device (e.g., personal electronic device 120 in FIG. 1) causes a popup to be displayed with the question "Would you like to switch into non-touch mode?" and includes yes and no buttons as well as directions for accepting or rejecting using relative motion input (e.g., tilt right for yes and tilt left for no). Thus, the user is able to determine whether to enter the relative motion input mode.

In other example embodiments, a status bar can inform the user how to enter the relative input mode without displaying a prompt or other pop up. For example, the personal electronic device (e.g., personal electronic device 120 in FIG. 1) detects that the relative input mode is potentially needed and causes the status bar to display "Tilt left once and back twice to enter a non-touch mode." The user can then follow the directions if the user wishes to enter the relative input mode.

In some example embodiments, the personal electronic device (e.g., personal electronic device 120 in FIG. 1) receives (714) input indicating user acceptance of the change of operating mode. For example, the user selects the "yes" button by tapping it or by tilting the device to the right. In other example embodiments, directions to enter the relative input mode are displayed on the status bar and the personal electronic device (e.g., personal electronic device 120 in FIG. 1) detects input matching the directions displayed on the status bar and in response determines that the user accepts changing the operating mode.

In some example embodiments, in response to receiving input indicating user acceptance of the change of operating mode, the personal electronic device (e.g., personal electronic device 120 in FIG. 1) changes (716) the operating mode of the personal electronic device from a touch input mode to a relative motion input mode. For example, the user input indicating user acceptance includes the user following a set of directions displayed to allow the user to indicate acceptance. In other example embodiments, the personal electronic device (e.g., personal electronic device 120 in FIG. 1) changes the operating mode automatically, without waiting for user approval, as soon as input irregularities or anomalies occur.

In some example embodiments, in response changing the operating mode of the personal electronic device from a touch input mode to a relative motion input mode, the personal electronic device (e.g., personal electronic device 120 in FIG. 1) updates (718) the displayed user interface to a relative motion input based user interface. The relative motion input based user interface is arranged in a direct simple format (e.g., interface components are made into rectangular boxes arranged in columns and rows) to facilitate ease of navigation throughout the user interface.

Figure 7B:
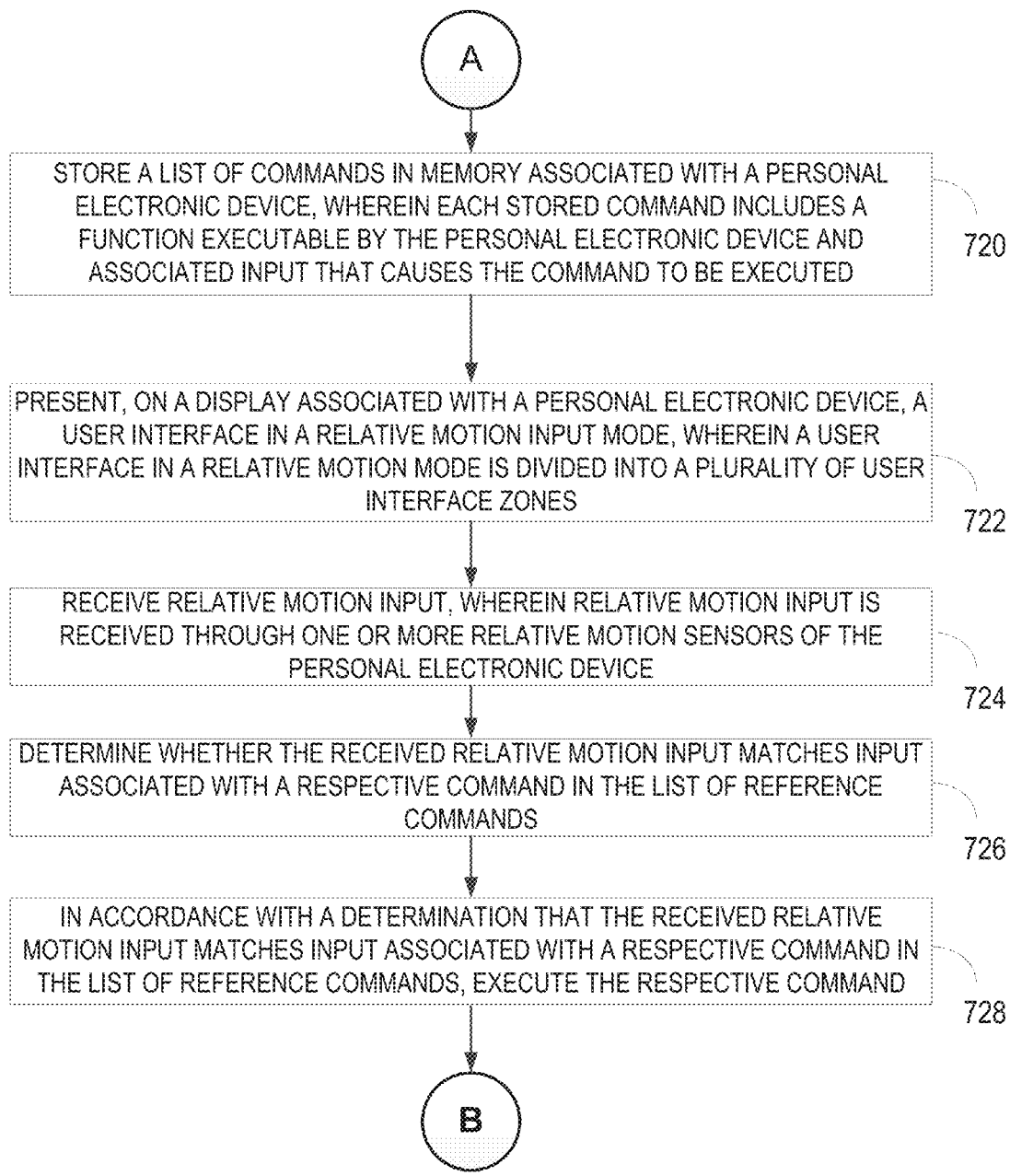

FIG. 7B is a flow diagram illustrating a method for improving input detection and usability of personal electronic devices when touch input is not the optimal input method, in accordance with some embodimentations. Each of the operations shown in FIG. 7B may correspond to instructions stored in a computer memory or computer-readable storage medium. Optional operations are indicated by dashed lines (e.g., boxes with dashed-line borders). In some embodimentations, the method described in FIG. 7B is performed by the personal electronic device (e.g., personal electronic device 120 in FIG. 1). However, the method described can also be performed by any other suitable configuration of electronic hardware.

In some embodimentations the method is performed at a personal electronic device (e.g., personal electronic device 120 in FIG. 1) including one or more processors and memory storing one or more programs for execution by the one or more processors.

In some example embodiments, the personal electronic device (e.g., personal electronic device 120 in FIG. 1) stores (720) a list of commands in memory associated with the personal electronic device, wherein each stored command includes a function executable by the personal electronic device and associated input that causes the command to be executed. For example, the personal electronic device (e.g., personal electronic device 120 in FIG. 1) includes a table in memory. Each entry in the table represents a command that is available to a user (e.g., move up in the user interface, move down, select an item, go back, undo, copy, paste, and so on).

In some example embodiments, the personal electronic device (e.g., personal electronic device 120 in FIG. 1) presents (722), on a display associated with the personal electronic device, a user interface in a relative motion input mode, wherein the user interface in a non-touch mode is divided into a plurality of user interface zones. In some example embodiments, the display associated with the personal electronic device is a touchscreen. For example, the user interface displays a series of interface components in specific user interface zones that are represented by regular rectangular shapes arranged in rows and columns for easy navigation.

In some example embodiments, the user interface used when the personal electronic device (e.g., personal electronic device 120 in FIG. 1) in relative motion input operating mode is predetermined (e.g., the creator of an app designates a user interface for non-touch operating mode). In other example embodiments, the personal electronic device (e.g., personal electronic device 120 in FIG. 1) automatically generates a user interface for use in relative motion input operating mode.

For example, the personal electronic device (e.g., personal electronic device 120 in FIG. 1) analyzes the standard (touch input mode) user interface to identify one or more user interface elements (e.g., buttons, inputs, icons, images, and so on). In some example embodiments, the personal electronic device (e.g., personal electronic device 120 in FIG. 1) assigns each identified element a regularly sized rectangle and places it in a grid of rows and columns. The user interface is displayed with all the interface elements in the grid.

In some example embodiments, the personal electronic device (e.g., personal electronic device 120 in FIG. 1) receives (724) relative motion input, wherein relative motion input is received through one or more non-touch sensors of the personal electronic device. In some example embodiments, the non-touch sensors of the personal electronic device include one or more of a gyroscope, an accelerometer, a microphone, and a camera. In some example embodiments, the received input includes one of detected shaking of the personal electronic device (e.g., personal electronic device 120 in FIG. 1), raising or lowering the personal electronic device (e.g., personal electronic device 120 in FIG. 1), tilting the device on any of the three dimensional axis, voice commands, visual cues, and so on.

In some example embodiments, the personal electronic device (e.g., personal electronic device 120 in FIG. 1) determines (726) whether the received relative motion input matches input associated with a respective command in the list of reference commands. To accomplish this, the personal electronic device (e.g., personal electronic device 120 in FIG. 1) converts sensor data into discrete input data. Input data describes the type of input (e.g., motion, sound, and so on) and the degree (e.g., five degrees, shaking for five seconds, certain volume levels or sounds, and so on).

In some example embodiments, the personal electronic device (e.g., personal electronic device 120 in FIG. 1) then compares the discrete input data to the input data stored in the list of stored commands. If the discrete input data matches input data stored in the list of stored commands, the personal electronic device (e.g., personal electronic device 120 in FIG. 1) determines that the received relative motion input matches input associated with a respective command in the list of reference commands.

In some example embodiments, in accordance with a determination that the received relative motion input matches input associated with a respective command in the list of reference commands, the personal electronic device (e.g., personal electronic device 120 in FIG. 1) executes (728) the respective command. For example, if the relative motion input matches input associated with the "paste" command, the personal electronic device (e.g., personal electronic device 120 in FIG. 1) then pastes the appropriate content.

In some example embodiments, before receiving relative motion input, a first user interface zone of the plurality of user interface zones is visually distinguished as selected, and wherein executing the respective command comprises, the personal electronic device (e.g., personal electronic device 120 in FIG. 1) changing the visually distinguished interface zone from the first user interface zone to a second user interface zone based on the respective command.

In some example embodiments, relative motion input represents a change in the personal electronic devices position or rotation. In other example embodiments, relative motion input represents motion of a user relative to the personal electronic device.

Figure 7C:
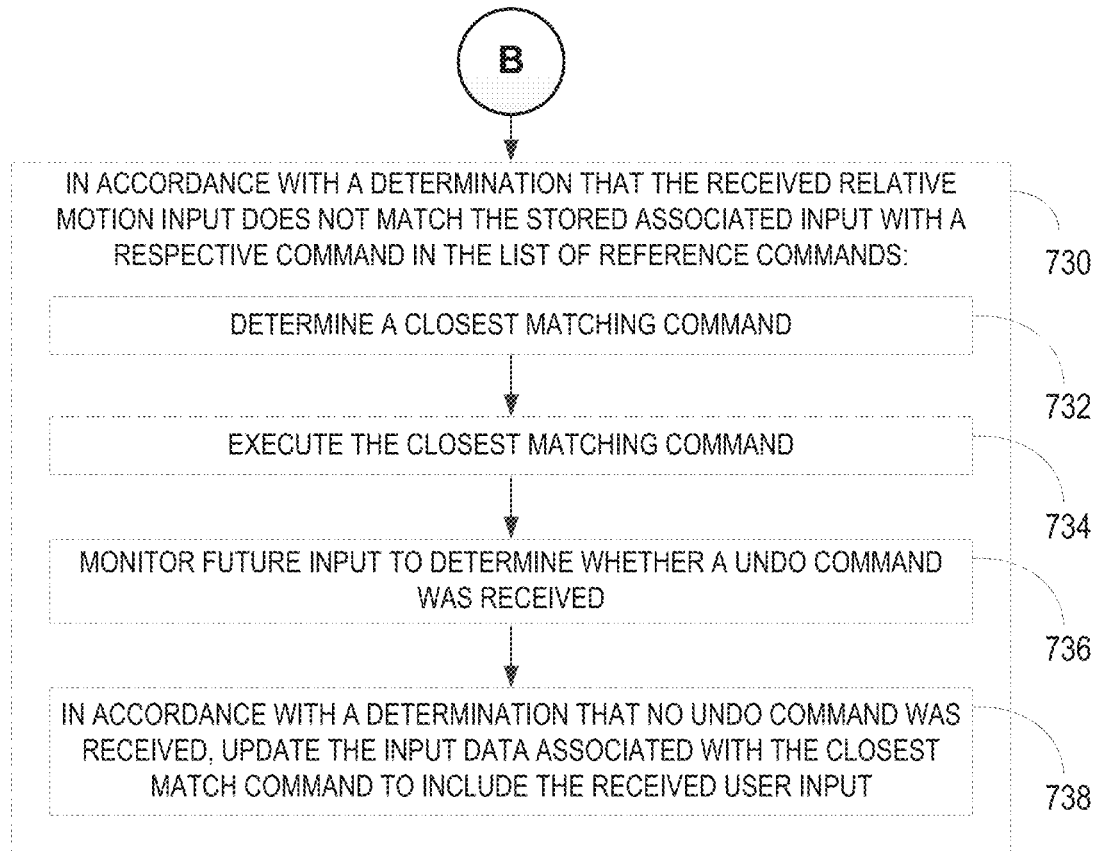

FIG. 7C is a flow diagram illustrating a method for for improving input detection and usability of personal electronic devices when touch input is not the optimal input method, in accordance with some embodimentations. Each of the operations shown in FIG. 7C may correspond to instructions stored in a computer memory or computer-readable storage medium. Optional operations are indicated by dashed lines (e.g., boxes with dashed-line borders). In some embodimentations, the method described in FIG. 7C is performed by the personal electronic device (e.g., personal electronic device 120 in FIG. 1). However, the method described can also be performed by any other suitable configuration of electronic hardware.

In some embodimentations the method is performed at a personal electronic device (e.g., personal electronic device 120 in FIG. 1) including one or more processors and memory storing one or more programs for execution by the one or more processors.

In some example embodiments, in accordance with a determination that the received non-touch user input does not match (730) the stored associated input with a respective command in the list of reference commands, the personal electronic device (e.g., personal electronic device 120 in FIG. 1) determines (732) a closest matching command. A closest matching command is determined by generating a match score for one or more commands. In some example embodiments, a match score for a respective command is generated by comparing the received input with the input associated with the respective command to determine the type of input, the direction of the input, the timing of the input, and the degree of the input. The command with the highest matching score is then selected as the closest matching command.

In some example embodiments, the personal electronic device (e.g., personal electronic device 120 in FIG. 1) then executes (734) the closest matching command.

In some example embodiments, after executing the personal electronic device (e.g., personal electronic device 120 in FIG. 1) monitors (736) future user inputs to determine whether an undo command was received. For example, once a closest matching command is executed, the personal electronic device (e.g., personal electronic device 120 in FIG. 1) needs to determine whether the matching command was, in fact, the intended command. If an undo command is detected immediately, the personal electronic device (e.g., personal electronic device 120 in FIG. 1) determines that the closest matching command was not the intended command. Once a predetermined amount of time passes (e.g., thirty seconds) or other commands are received, the personal electronic device (e.g., personal electronic device 120 in FIG. 1) determines that the closest matching command was the intended command.

In some example embodiments, in accordance with a determination that no undo command was received, the personal electronic device (e.g., personal electronic device 120 in FIG. 1) updates (738) the input data associated with the closest matching command to include the received user input. For example, if the received input was a five degree tilt to the left of the personal electronic device (e.g., personal electronic device 120 in FIG. 1) and the closest matching command has associated input of a ten degree tilt to the left of the personal electronic device (e.g., personal electronic device 120 in FIG. 1), the input for the closest matching command is updated to include the range five degrees to ten degrees tilt to the left. Thus, the input for a command is updated to adapt to a user's particular preferences without the user's explicit command.

In some example embodiments, input data associated with a stored command includes a range of possible inputs. For example, an input for the "up" command is a movement of the device upwards a distance in the range of one inch to three inches. Thus, any input in that range will trigger the "up" command.

In some example embodiments, updating the input data associated with the closest match command to include the received user input data comprises extending the range of possible inputs to cover the received user input.

Software Architecture

Figure 8:
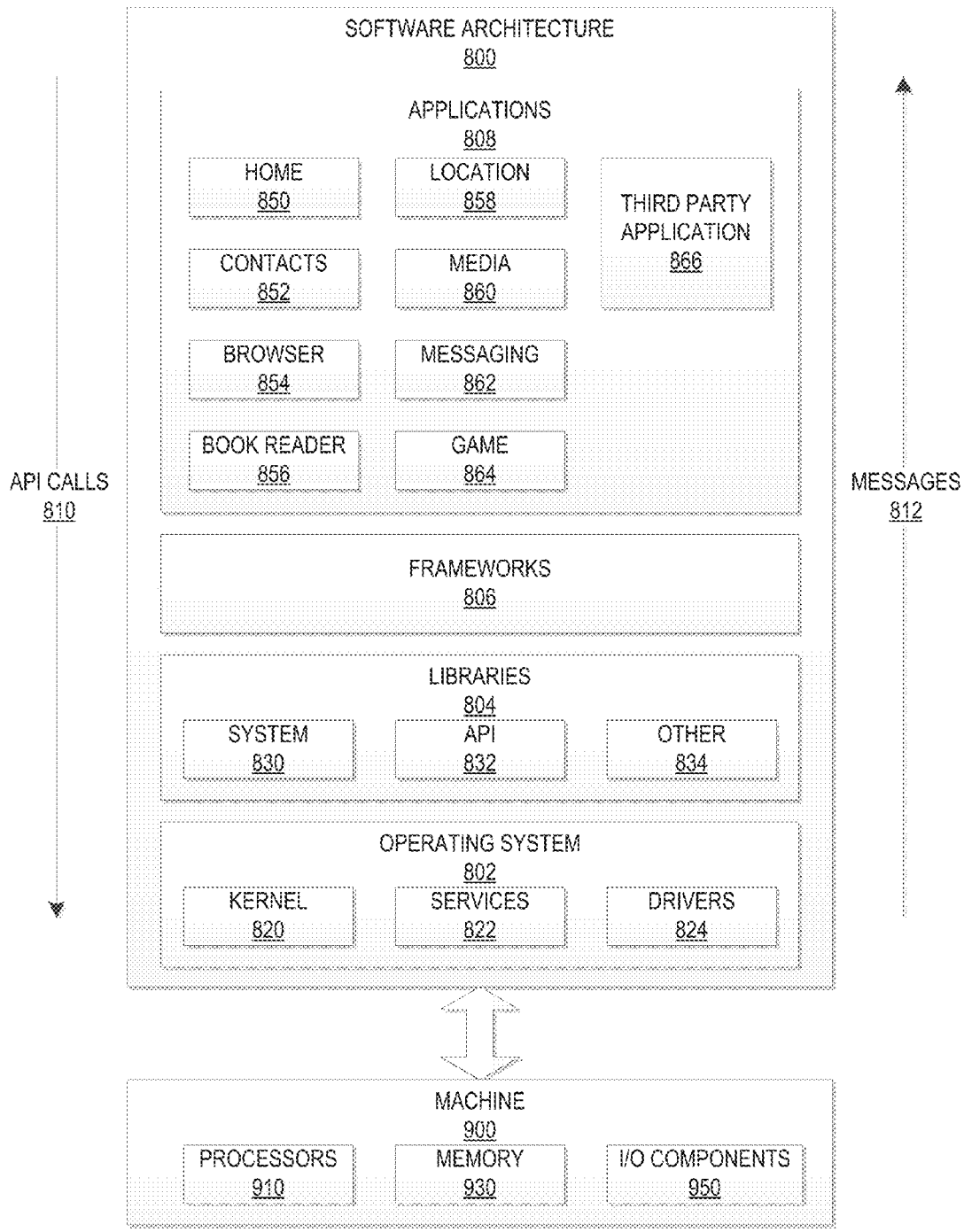
FIG. 8 is a block diagram illustrating an architecture of software, in accordance with an example embodiment, which may be installed on any one or more devices.

FIG. 8 is a block diagram illustrating an architecture of software 800, in accordance with an example embodiment, which may be installed on any one or more of the devices of FIG. 1 (e.g., the personal electronic device 120). FIG. 8 is merely a non-limiting example of a software architecture and it will be appreciated that many other architectures may be embodied to facilitate the functionality described herein. The software 800 may be executing on hardware such as a machine 900 of FIG. 9 that includes processors 910, memory 930, and I/O components 950. In the example architecture of FIG. 8, the software 800 may be conceptualized as a stack of layers where each layer may provide particular functionality. For example, the software 800 may include layers such as an operating system 802, libraries 804, frameworks 806, and applications 808. Operationally, the applications 808 may invoke application programming interface (API) calls 810 through the software stack and receive messages 812 in response to the API calls 810.

The operating system 802 may manage hardware resources and provide common services. The operating system 802 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 may be responsible for controlling and/or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 804 may provide a low-level common infrastructure that may be utilized by the applications 808. The libraries 804 may include system libraries (e.g., C standard library) 830 that may provide functions such as memory allocation functions, string manipulation functions, mathematic functions, and the like. In addition, the libraries 804 may include API libraries 832 such as media libraries (e.g., libraries to support presentation and manipulation of various media formats, such as MPEG4, H.264, MP3, AAC, AMR, JPG, or PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 804 may also include a wide variety of other libraries 834 to provide many other APIs to the applications 808.

The frameworks 806 may provide a high-level common infrastructure that may be utilized by the applications 808. For example, the frameworks 806 may provide various graphic user interface (GUI) functions, high-level resource management, high-level location services, and so forth. The frameworks 806 may provide a broad spectrum of other APIs that may be utilized by the applications 808, some of which may be specific to a particular operating system or platform.

The applications 808 include a home application 850, a contacts application 852, a browser application 854, a book reader application 856, a location application 858, a media application 860, a messaging application 862, a game application 864, and a broad assortment of other applications, such as a third party application 866. In a specific example, the third party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 866 may invoke the API calls 810 provided by the operating system 802 to facilitate functionality described herein.

Example Machine Architecture and Machine-Readable Medium

Figure 9:
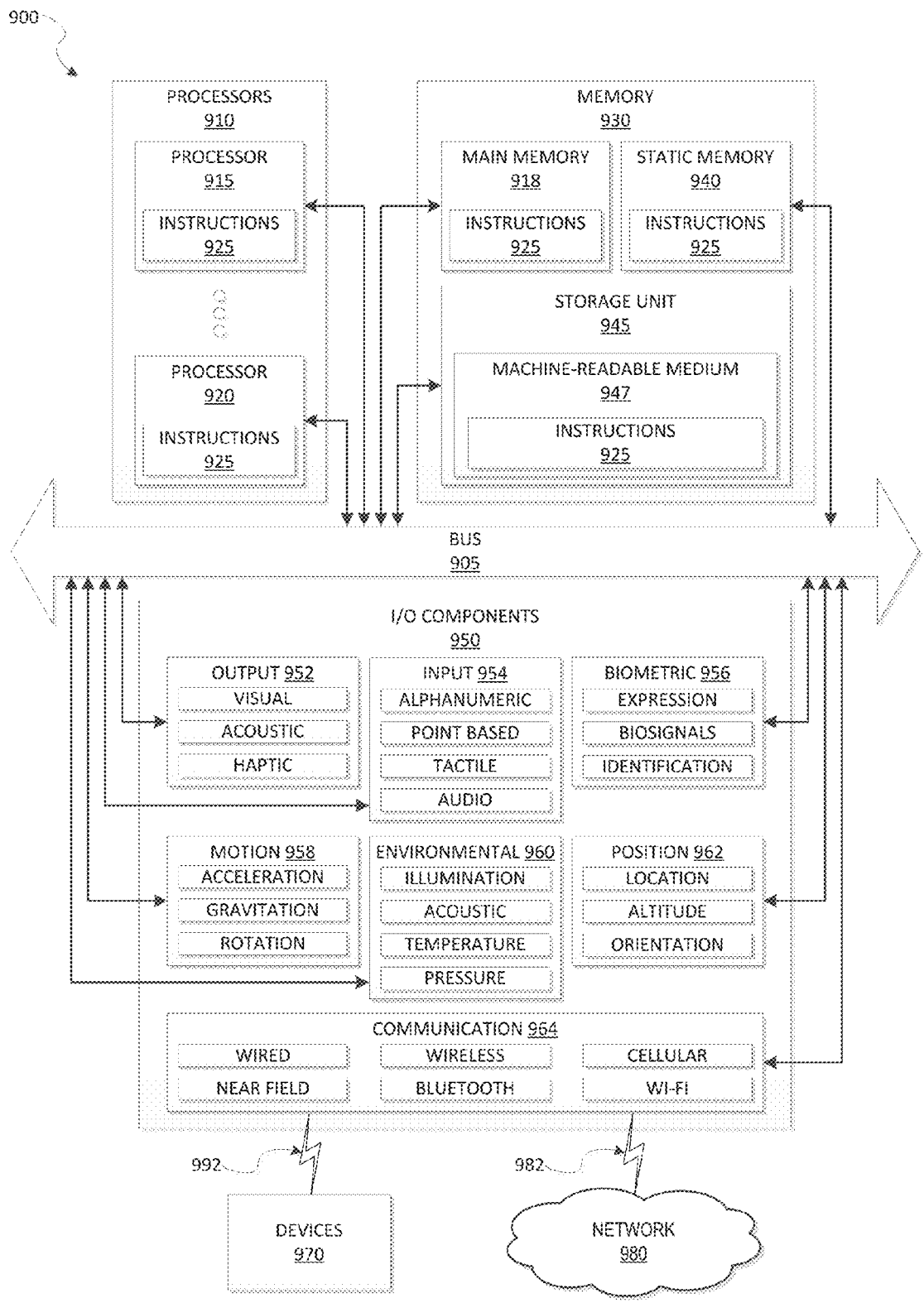
FIG. 9 is a block diagram illustrating components of a machine, in accordance with an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 925 (e.g., software, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 925, sequentially or otherwise, that specify actions to be taken by the machine 900. Further, while only a single machine 900 is illustrated, the term "machine" shall also be taken to include a collection of machines 900 that individually or jointly execute the instructions 925 to perform any one or more of the methodologies discussed herein.

The machine 900 may include processors 910, memory 930, and I/O components 950, which may be configured to communicate with each other via a bus 905. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 915 and a processor 920 that may execute instructions 925. The term "processor" is intended to include multi-core processors that may comprise two or more independent processors (also referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 918, a static memory 940, and a storage unit 945 accessible to the processors 910 via the bus 905. The storage unit 945 may include a machine-readable medium 947 on which are stored the instructions 925 embodying any one or more of the methodologies or functions described herein. The instructions 925 may also reside, completely or at least partially, within the main memory 918, within the static memory 940, within at least one of the processors 910 (e.g., within the processor's cache memory), or any suitable combination thereof, during execution thereof by the machine 900. Accordingly, the main memory 918, the static memory 940, and the processors 910 may be considered machine-readable media 947.

As used herein, the term "memory" refers to a machine-readable medium 947 able to store data temporarily or permanently, and may be taken to include, but not be limited to, random-access memory (RAM), read-only memory (ROM), buffer memory, flash memory, and cache memory. While the machine-readable medium 947 is shown in an example embodiment to be a single medium, the term "machine-readable medium" should be taken to include a single medium or multiple media (e.g., a centralized or distributed database, or associated caches and servers) able to store instructions 925. The term "machine-readable medium" shall also be taken to include any medium, or combination of multiple media, that is capable of storing instructions (e.g., the instructions 925) for execution by a machine (e.g., the machine 900), such that the instructions, when executed by one or more processors of the machine (e.g., the processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 may include a wide variety of components to receive input, provide and/or produce output, transmit information, exchange information, capture measurements, and so on. It will be appreciated that the I/O components 950 may include many other components that are not shown in FIG. 9. In various example embodiments, the I/O components 950 may include output components 952 and/or input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or another pointing instrument), tactile input components (e.g., a physical button, a touch screen that provides location and force of touches or touch gestures, and/or other tactile input components), audio input components (e.g., a microphone), and the like.

In further example embodiments, the I/O components 950 may include biometric components 956, motion components 958, environmental components 960, and/or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 962 may include location sensor components (e.g., a Global Position System (GPS) receiver component), altitude sensor components (e.g., altimeters and/or barometers that detect air pressure, from which altitude may be derived), orientation sensor components (e.g., magnetometers), and the like.

Communication may be embodied using a wide variety of technologies. The I/O components 950 may include communication components 964 operable to couple the machine 900 to a network 980 and/or to devices 970 via a coupling 982 and a coupling 992 respectively. For example, the communication components 964 may include a network interface component or another suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine and/or any of a wide variety of peripheral devices (e.g., a peripheral device coupled via a Universal Serial Bus (USB)).

Moreover, the communication components 964 may detect identifiers and/or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information may be derived via the communication components 964, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may embody any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 925 may be transmitted and/or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 925 may be transmitted and/or received using a transmission medium via the coupling 992 (e.g., a peer-to-peer coupling) to the devices 970. The term "transmission medium" shall be taken to include any intangible medium that is capable of storing, encoding, or carrying the instructions 925 for execution by the machine 900, and includes digital or analog communications signals or other intangible media to facilitate communication of such software.

Furthermore, the machine-readable medium 947 is non-transitory (in other words, not having any transitory signals) in that it does not embody a propagating signal. However, labeling the machine-readable medium 947 "non-transitory" should not be construed to mean that the medium 947 is incapable of movement; the medium 947 should be considered as being transportable from one physical location to another. Additionally, since the machine-readable medium 947 is tangible, the medium 947 may be considered to be a machine-readable device.

TERM USAGE

Throughout this specification, plural instances may be embodied as components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be embodied as a combined structure or component. Similarly, structures and functionality presented as a single component may be embodied as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be embodied as a combined structure or resource. Similarly, structures and functionality presented as a single resource may be embodied as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for purpose of explanation, has been described with reference to specific embodiments. However, the illustrative discussions above are not intended to be exhaustive or to limit the possible embodiments to the precise forms disclosed. Many modifications and variations are possible in view of the above teachings. The embodiments were chosen and described in order to best explain the principles involved and their practical applications, to thereby enable others skilled in the art to best utilize the various embodiments with various modifications as are suited to the particular use contemplated.

It will also be understood that, although the terms "first," "second," etc. may be used herein to describe various elements, these elements should not be limited by these terms. These terms are only used to distinguish one element from another. For example, a "first contact" could be termed a "second contact," and, similarly, a "second contact" could be termed a "first contact," without departing from the scope of the present embodiments. The first contact and the second contact are both contacts, but they are not the same contact.

The terminology used in the description of the embodiments herein is for the purpose of describing particular embodiments only and is not intended to be limiting. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining (the stated condition or event)" or "in response to determining (the stated condition or event)" or "upon detecting (the stated condition or event)" or "in response to detecting (the stated condition or event)," depending on the context.

This written description uses examples to disclose the inventive subject matter, including the best mode, and also to enable any person skilled in the art to practice the inventive subject matter, including making and using any devices or systems and performing any incorporated methods. The patentable scope of the inventive subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising: storing a list of commands in memory associated with a personal electronic device, wherein each stored command includes a function executable by the personal electronic device and an associated input that causes the command to be executed; receiving user input through a touchscreen associated with the personal electronic device; detecting one or more touch input anomalies in the received user input; and in response to detecting one or more touch anomalies in the received user input: changing the operating mode of the personal electronic device from a touch input mode to a relative motion input mode; and altering a displayed user interface to a relative motion input-based user interface such that the user interface in the relative motion mode is divided into a plurality of user interface zones; receiving relative motion input, wherein the relative motion input is received through one or more relative motion sensors of the personal electronic device; determining whether the received relative motion input matches input associated with a respective command in a list of reference commands; in accordance with a determination that the received relative motion input matches input is associated with a respective command in the list of reference commands, executing the respective command; and in accordance with a determination that the received relative motion input does not match stored input associated with a respective command in the list of reference commands, determining and executing a closest matching command.

2. The method of claim 1, wherein before receiving relative motion input, a first user interface zone of the plurality of user interface zones is visually distinguished as selected, and wherein executing the respective-command comprises:
 changing the visually distinguished interface zone from the first user interface zone to a second user interface zone based on the respective command.

3. The method of claim 1, wherein relative motion input represents a change in the personal electronic devices position or rotation.

4. The method of claim 1, wherein relative motion input represents motion of a user relative to the personal electronic device.

5. The method of claim 1, wherein the display associated with the personal electronic device is a touchscreen.

6. The method of claim 1, wherein the relative motion sensors of the personal electronic device include one or more of a gyroscope, an accelerometer, a microphone, and a camera.

7. The method of claim 1, further comprising, after executing the closest matching command, monitoring future user inputs to determine whether an undo command was received; and
 in accordance with a determination that no undo command was received, updating input data associated with the closest matching command to include the received user input.

8. The method of claim 7, wherein input data associated with a stored command includes a range of possible inputs.

9. The method of claim 8, wherein updating the input data associated with the closest matching command to include the received user input further comprises extending the range of possible inputs to cover the received user input.

10. The method of claim 1, further including, prior to changing the operating mode of the personal electronic device from the touch input mode to the relative motion input mode, displaying an operating mode change notification on the display associated with the personal electronic device.

11. The method of claim 1, further including, prior to changing the operating mode of the personal electronic device from the touch input mode to the relative motion input mode, displaying a prompt message on the display associated with the personal electronic device, wherein the prompt message suggests a change of operating mode;
 receiving input indicating user acceptance of the change of operating mode; and
 in response to receiving the input indicating user acceptance of the change of operating mode, changing the operating mode of the personal electronic device from the touch input mode to the relative motion input mode.

12. An electronic device comprising: a storage module to store a list of commands in memory associated with a personal electronic device, wherein each stored command includes a function executable by the electronic device and associated input that causes the command to be executed; an error response module to: receive user input through a touchscreen associated with the personal electronic device; detect one or more touch input anomalies in the received user input; and in response to detecting one or more touch anomalies in the received user input: change the operating mode of the personal electronic device from a touch input mode to a relative motion input mode; and alter a displayed user interface to a relative motion input-based user interface such that the user interface in the relative motion mode is divided into a plurality of user interface zones;
 a reception module to receive relative motion input, wherein the relative motion input is received through one or more relative motion sensors of the personal electronic device; an input analysis module to determine whether the received relative motion input matches input associated with a respective command in a list of reference commands; and an execution module to, in accordance with a determination that the received relative motion input matches input is associated with a respective command in the list of reference commands, execute the respective command, and in accordance with a determination that the received relative motion in out does not match stored input associated with a respective command in the list of reference commands, determining and executing a closest matching command.

13. The system of claim 12, wherein before receiving relative motion input, a first user interface zone of the plurality of user interface zones is visually distinguished as selected, and further comprising:
 a change module to change the visually distinguished interface zone from the first user interface zone to a second user interface zone based on the respective command.

14. The electronic device of claim 12, wherein the relative motion sensors of the electronic device include one or more of a gyroscope, an accelerometer, a microphone, and a camera.

15. A non-transitory computer-readable storage medium storing instructions that, when executed by the one or more processors of a machine, cause the machine to perform operations comprising: storing a list of commands in memory associated with a personal electronic device, wherein each stored command includes a function executable by the personal electronic device and associated input that causes the command to be executed; receiving user input through a touchscreen associated with the personal electronic device; detecting one or more touch input anomalies in the received user input; and in response to detecting one or more touch anomalies in the received user input; changing the operating mode of the personal electronic device from a touch input mode to a relative motion input mode; and altering a displayed user interface to a relative motion input-based user interface such that the user interface in the relative motion mode is divided into a plurality of user interface zones; receiving relative motion input, wherein the relative motion input is received through one or more relative motion sensors of the personal electronic device; determining whether the received relative motion input matches input associated with a respective command in a list of reference commands; in accordance with a determination that the received relative motion input matches input is associated with a respective command in the list of reference commands, executing the respective command; and in accordance with a determination that the received relative motion in out does not match stored input associated with a respective command in the list of reference commands, determining and executing a closest matching command.

16. The non-transitory computer-readable storage medium of claim 15, wherein before receiving relative motion input, a first user interface zone of the plurality of user interface zones is visually distinguished as selected, and wherein executing the respective command comprises:

changing the visually distinguished interface zone from the first user interface zone to a second user interface zone based on the respective command.

17. The non-transitory computer-readable storage medium of claim 16, wherein the relative motion sensors of the personal electronic device include one or more of a gyroscope, an accelerometer, a microphone, and a camera.

18. The method of claim 1, wherein in the touch input mode, the displayed user interface displays a standard user interface for an application displayed.

19. The electronic device of claim 12, wherein in the touch input mode, the displayed user interface displays a standard user interface for an application displayed.

20. The non-transitory computer-readable storage medium of claim 15, wherein in the touch input mode, the displayed user interface displays a standard user interface for an application displayed.

* * * * *

UNITED STATES PATENT AND TRADEMARK OFFICE
CERTIFICATE OF CORRECTION

PATENT NO. : 9,746,930 B2
APPLICATION NO. : 14/670293
DATED : August 29, 2017
INVENTOR(S) : Chih-Sung Wu It is certified that error appears in the above-identified patent and that said Letters Patent is hereby corrected as shown below:

In the Claims

In Column 24, Line 17, in Claim 12, delete "in out" and insert --input-- therefor In Column 24, Line 21, in Claim 13, delete "The system of claim 12," and insert --The electronic device of claim 12,-- therefor In Column 24, Line 60, in Claim 15, delete "in out" and insert --input-- therefor Signed and Sealed this
Twenty-ninth Day of May, 2018

Andrei Iancu
*Director of the United States Patent and Trademark Office*